United States Patent
Altinger et al.

(10) Patent No.: US 10,466,703 B2
(45) Date of Patent: Nov. 5, 2019

(54) METHOD FOR CONTROLLING AT LEAST ONE VEHICLE, WHICH MOVES AT LEAST PARTIALLY AUTONOMOUSLY WITHIN AN OPERATING ENVIRONMENT, AND STRUCTURE

(71) Applicant: AUDI AG, Ingolstadt (DE)

(72) Inventors: Harald Altinger, Gerolfing (DE); Florian Schuller, Ismaning (DE); Christian Feist, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 16/301,637

(22) PCT Filed: Apr. 26, 2017

(86) PCT No.: PCT/EP2017/059963
§ 371 (c)(1),
(2) Date: Jan. 9, 2019

(87) PCT Pub. No.: WO2017/198433
PCT Pub. Date: Nov. 23, 2017

(65) Prior Publication Data
US 2019/0250613 A1    Aug. 15, 2019

(30) Foreign Application Priority Data
May 18, 2016  (DE) .................. 10 2016 006 119

(51) Int. Cl.
*G05D 1/00* (2006.01)
*E04H 6/42* (2006.01)
*G05D 1/02* (2006.01)

(52) U.S. Cl.
CPC .......... *G05D 1/0088* (2013.01); *E04H 6/422* (2013.01); *G05D 1/0274* (2013.01); *G05D 1/0297* (2013.01); *G05D 2201/0213* (2013.01)

(58) Field of Classification Search
CPC .. G05D 1/0088; G05D 1/0297; G05D 1/0274; G05D 2201/0213; E04H 6/422
See application file for complete search history.

(56) References Cited

U.S. PATENT DOCUMENTS

| 6,472,988 | B1 | 10/2002 | Feld et al. |
| 10,002,525 | B2 | 6/2018 | Scheerle et al. |
(Continued)

FOREIGN PATENT DOCUMENTS

| CN | 104755343 A | 7/2015 |
| CN | 105358396 A | 2/2016 |
(Continued)

OTHER PUBLICATIONS

International Search Report and Written Opinion of the International Search Authority directed to related International Patent Application No. PCT/EP2017/059963, dated Aug. 3, 2017, with attached English-language translation; 23 pages.

(Continued)

*Primary Examiner* — Russell Frejd
(74) *Attorney, Agent, or Firm* — Sterne, Kessler, Goldstein & Fox P.L.L.C.

(57) ABSTRACT

A method is disclosed for controlling at least one vehicle moving at least partially autonomously within an operating environment. One trigger device is designed within the operating environment for triggering a stop signal for stopping the at least one vehicle. A computing device allocated to the operating environment receives the stop signal of the triggered trigger device and determines a set of vehicles to be stopped by evaluating positional data describing the position of the triggered trigger device and the position of the at least one vehicle. The computing device orders the at least one vehicle to stop depending on the evaluation result.

20 Claims, 2 Drawing Sheets

(56) References Cited

U.S. PATENT DOCUMENTS

| | | | |
|---|---|---|---|
| 2008/0266078 A1* | 10/2008 | Koie | G08B 25/016 |
| | | | 340/539.13 |
| 2012/0188100 A1 | 7/2012 | Min et al. | |
| 2015/0286219 A1 | 10/2015 | Reichel et al. | |
| 2016/0005313 A1* | 1/2016 | Cholayil | G08G 1/095 |
| | | | 340/907 |
| 2016/0368491 A1 | 12/2016 | Hauler et al. | |
| 2017/0297569 A1* | 10/2017 | Nilsson | G05D 1/0061 |
| 2017/0309092 A1* | 10/2017 | Rosenbaum | G07C 5/008 |
| 2017/0309177 A1 | 10/2017 | Hoffmann et al. | |
| 2018/0229738 A1* | 8/2018 | Nilsson | B60W 50/029 |

FOREIGN PATENT DOCUMENTS

| | | | | |
|---|---|---|---|---|
| DE | 19822412 A1 | | 11/1999 | |
| DE | 10336084 A1 | | 3/2005 | |
| DE | 102008017129 A1 | | 10/2009 | |
| DE | 102011079703 A1 | | 1/2013 | |
| DE | 102012016867 A1 | | 9/2013 | |
| DE | 102013010819 A1 | | 12/2014 | |
| DE | 102014221771 A1 | | 4/2016 | |
| EP | 0413659 A1 | | 2/1991 | |
| EP | 2957481 A1 | | 12/2015 | |
| EP | 3232286 A1 | * | 10/2017 | G05D 1/0061 |
| WO | WO 2016/0066354 A1 | | 5/2016 | |

OTHER PUBLICATIONS

International Preliminary Report on Patentability directed to related International Patent Application No. PCT/EP2017/059963, dated Jun. 4, 2018, with attached English-language translation; 12 pages.

* cited by examiner

METHOD FOR CONTROLLING AT LEAST ONE VEHICLE, WHICH MOVES AT LEAST PARTIALLY AUTONOMOUSLY WITHIN AN OPERATING ENVIRONMENT, AND STRUCTURE

TECHNICAL FIELD

The invention relates to a method for controlling at least one vehicle moving at least partially autonomously within an operating environment within which there is at least one trigger device for triggering a stop signal to stop the vehicle.

BACKGROUND

In closed operating environments in which vehicles move partially autonomously or completely autonomously, normally vehicle-side sensors serve to avoid collisions with objects in the environment of the vehicle. One must assume that there are also persons in the operating environment and typically at least one trigger device is provided within the operating environment as an additional safety measure. Using this, a stop signal can be triggered which causes the vehicle to stop immediately. One known example of this is an emergency cut off switch which can be actuated by a person when for example a collision of the vehicle with other vehicles or with an object or another person threatens.

In conventional methods, however such a stop signal typically is transmitted from a trigger device to all vehicles in the operating environment or to all vehicles coupled to the trigger device (for example by cable, radio, or an identification means), so that after triggering a complete operational standstill ensues.

Such a generalized stopping of all vehicles consequently means that vehicles that are moving entirely problem-free at the time of triggering are also stopped. This applies in particular when a plurality of triggering devices are used in an operating environment with a plurality of vehicles. To eliminate the operating standstill, consequently, a very time-consuming enabling of operation of the vehicles is necessary.

BRIEF DESCRIPTION OF THE DRAWINGS/FIGURES

DETAILED DESCRIPTION

Figure 1:
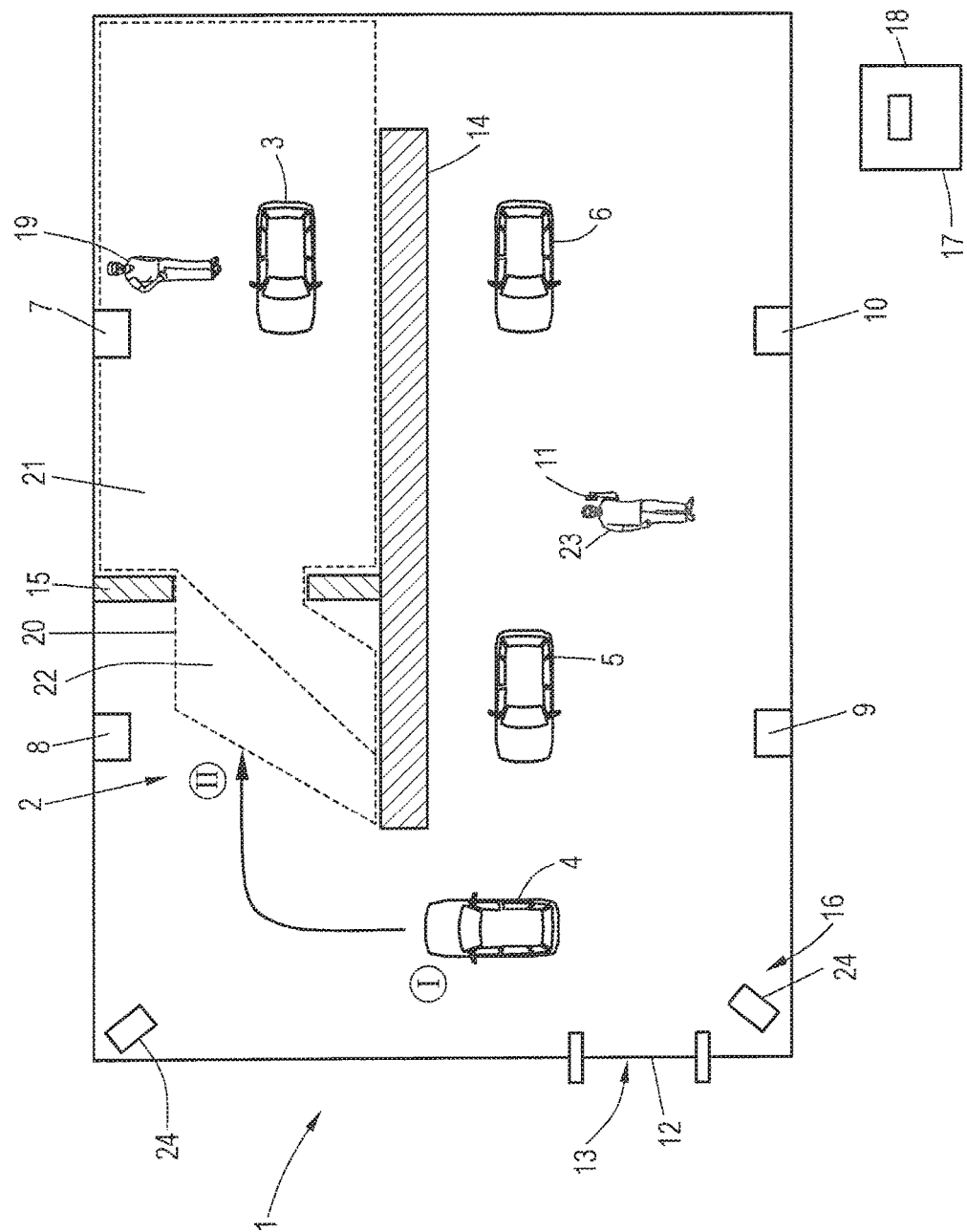
FIG. 1 illustrates a schematic view of a structure from a bird's eye view as an operating environment for several autonomously operated vehicles, according to some embodiments of this disclosure.

It is consequently the object of the invention to avoid undesired stopping of the or a vehicle when controlling at least one vehicle moving at least partially autonomously within the operating environment when triggering the trigger device.

To achieve this object, it is provided by a method of the above-named type according to the invention that a computing device allocated to the operating environment executes the following steps:

Receive a stop signal of a triggered trigger device;
Determine a set of vehicles to be halted by means of evaluations of positional data which describe the position of the triggered trigger device and a position of at least a vehicle located in the operating environment; and
Command the vehicle to stop depending on the evaluation results.

The invention is based on the consideration of providing a computing device allocated to the operating environment which acts as the central coordination point between the at least one trigger device and at least a vehicle and after receipt of the stop signal orders only those vehicles to stop in which based on a spatial relationship to the triggered trigger device it must be assumed that stopping is desired.

In other words, after receipt of the stop signal of the triggered trigger device typically by means of a communication connection, the computing device conducts a test to determine whether the vehicle should be stopped or which of several vehicles are to be stopped. Here triggering is to be understood as both an actively transmitted emergency stop signal as well as a passively produced dead-man signal. Consequently, the position of the triggered trigger device and the position of the vehicle located within the operating environment are evaluated to determine the set of vehicles to be stopped as a subset of the at least one vehicle located in the operating environment. This set can be represented by a list, for example. Control of the vehicle then occurs depending on the evaluation result by means of a control signal that is transmitted by the computing device to the vehicle.

The set to be determined, depending on the operating case, can be zero, can comprise the vehicle, and/or can comprise at least one further vehicle. Of course, it is also conceivable that based on the evaluation of the positional data all vehicles within the operating environment are included in the set of vehicles to be stopped. Control of the vehicle then occurs depending on the evaluation results, thus depending on the set of the vehicles to be stopped, where advantageously the or each vehicle belonging to the set is ordered to stop and/or the or each vehicle not belonging to the set is ordered to maintain its motion status.

Consequently the method according to the invention advantageously allows selection of the at least one vehicle moving in the operating environment as regards its position relative to the triggered trigger device, so that only those vehicles are stopped for which the stop signal can be viewed as relevant.

An undesired stop can thus be advantageously avoided for vehicles within the environment that have no spatial relationship to the position of the trigger device, so that their operation is not impaired. But also, for the case when only the vehicle and no other vehicle is in the operating environment, undesired stopping maneuvers in the case of false triggering of the triggering device or a manipulation can be avoided when the evaluation of the positional data finds no relevance of the stop signal to the vehicle. The method has proven especially advantageous also when several, and particularly differently configured trigger devices are built into the operating environment so that upon triggering of a trigger device only vehicles relevant to their position are stopped.

In the method according to the invention at least one fixed trigger device can be used. This is typically a fixedly installed trigger device whose position can be basically known to the computing device and accordingly described by the positional data. Alternatively, or additionally at least one portable trigger device can be used. This can be carried, for example, by a person who is in the operating environment or can observe it from outside of the operating environment, and can be triggered as needed. Since the position of such a trigger device is variable, it is useful if the positional data describing the position of the portable trigger device is obtained during and/or after the triggering and/or continuously by the computing device, which will be addressed further below.

According to some embodiments, a trigger device is used that is designed as a manual actuation device. This can be a push switch, for example, and/or a touch switch. Basically, such a manual actuation device can be provided in a fixed position or it can be portable. Alternatively or additionally, a trigger device comprising an interrupt sensor can be used. The interrupt sensor can be a light barrier for example, in particular a light curtain. Typically, such a trigger device is in a fixed position and serves for example for detecting an undesired entry of the operating environment or a part of it. For these purposes, alternatively or additionally, a trigger device comprising a proximity sensor can be used.

According to some embodiments, the set of the vehicles to be stopped may be obtained with consideration of at least one subspace of the operating environment. Consequently, it is recommended that for determining the spatial relevance of the stop signal at least one subspace of the operating environment be determined, which is used in the evaluation of the positional data. Here the at least one subspace itself can be determined from the positional data. Advantageously the at least one subspace is or will be allocated to the triggered fixed trigger device and/or, depending on position, the triggered portable trigger device. But it is also possible that the at least one subspace is or will be allocated to the or one vehicle. The at least one subspace can consequently be seen as an interesting region or relevance region as regards the triggered trigger device or the at least one vehicle, where with several vehicles in the operating environment advantageously a subspace is determined for each vehicle.

The at least one subspace here describes a particularly cohesive subset of the operating environment which is relevant for determining the set of vehicles to be stopped. The at least one subspace can in particular comprise or consist of a roadway region drivable by the at least one vehicle. By determining the at least one subspace, advantageously an exact as possible modeling of the spatial conditions and in particular obstacles of the operating environment is achieved.

In order, with special advantage, to allow a low-cost determination of the set of vehicles to be stopped using the computing device, it is preferred if the computing device determines whether the position of the vehicle is located within a subspace formed as a surrounding region of the trigger device. Consequently, those vehicles are included in a set of vehicles to be stopped whose position described by the positional data lies within the subspace determined with respect to the triggered trigger device. Alternatively, or additionally, the computing device can determine whether the position of the trigger device is located within the at least one subspace formed as a surrounding region around the vehicle. Consequently, those vehicles are included in the set of vehicles to be stopped for which a subspace formed with respect to their position includes the position of the trigger device. Within the scope of the method according to the invention, however, it is also conceivable that at least one such vehicle is included in the set of vehicles to be stopped for which the allocated subspace overlaps with the allocated subspace of the triggered trigger device. In this way in some circumstances more vehicles are included in the set of the indicative vehicles than in the previously described test of whether the position of the trigger device or the vehicle is located in one subspace.

It can also be provided that the subspace allocated to the trigger device describes a region of the operating environment visible for the person triggering the trigger device, and/or the at least one subspace allocated to the vehicle describes a visible region of the operating environment for a person located at the position of the vehicle. The subspace is then also understandable as a visible region with regard to the trigger device or the vehicle, so that its visibility from the perspective of the trigger device or vice versa is used as the criterion for stopping a vehicle. This is based on the consideration that the triggering of the trigger device by a person usually is based on a visually determined reason. The person triggering the trigger device can see, for example, that a vehicle is on a collision course with them or that a vehicle is on a collision course with an object. It is consequently to be assumed that a stop signal should only apply to vehicles for which there is a line of sight with the trigger device. To determine the visible region, the computing device for example can consider information that will describe obstacles to vision, in particular structural obstacles to vision such as walls or pillars. Regions not blocked by obstacles to vision can then be determined as a subspace. In addition it is possible that the visible region is expanded by at least one expansion region abutting it that is not visible in order to be able to also stop vehicles that may not be in the visible region could shortly reach it.

As already mentioned, typically a stop signal is used which is triggered by active actuation of the trigger device or based on a sensor signal. It is especially advantageous in the method according to the invention that the stop signal is also triggered when there is an interruption of a communication connection between the at least one trigger device and the computing device. Such an interruption can be caused for example by a fault and/or a malfunction of the trigger device. Such a fault of a trigger device is then treated as an active triggering in order to ensure a higher safety level.

According to some embodiments, when during a predetermined or pre-determinable period after receipt of a stop signal and/or up to receipt of a release signal nullifying the stop signal for the vehicle which does not belong to the set of vehicles to be stopped, the positional data is evaluated again and the vehicle, depending on this evaluation result, is ordered to stop. In order to ensure that even after an initial evaluation of the positional data and control of the vehicle, until further notice no traffic occurs in the region that is relevant for the position of the triggered trigger device, another evaluation and control action are consequently recommended. This relates, however, to vehicles that as a consequence of the initial evaluation were not included in the set of vehicles to be stopped. In addition, a time period can be or will be predetermined during which the renewed evaluation may optionally be carried out multiple times. Alternatively, or additionally, this can take place until the computing device receives the release signal, where the loss of the stop signal of the triggered trigger device can also be viewed as a release signal.

According to some embodiments, the computing device determines the positional data at least partially from the sensor data of the sensor unit arranged within the operating environment. The sensor unit here advantageously provides sensor data to the computing device that will describe objects located in the operating environment. A sensor device having at least one camera and/or at least one radar sensor and/or at least one laser sensor. In this way the advantage is implemented that in particular the positional data describing the position of the at least one vehicle and/or the least one portable triggering device can be obtained especially simply. Here it is preferred if the computing device in any case is configured to control the motion of vehicles during their stay in the operating environment and considers the sensor data for that purpose.

According to some embodiments, the computing device uses a map data describing the operating environment where, in the evaluation of the positional data that map data is considered and/or the positional data is at least partially obtained from the map data. On the basis of the map described by the map data, in particular a 2-D or 3-D map, for example the at least one subspace can be determined and/or specially simply examined whether the position of the trigger device and/or the position of the vehicle is located in the subspace. In this regard, information describing obstacles to vision within the operating environment may also be derived from the map data. Apart from that, it is helpful if the positional data describing the position of a fixed trigger device is obtained from the map data.

According to some embodiments, the computing device for controlling the vehicles to be stopped relays the stop signal to the latter. In this case the computing device functions as a router which implements the coordination of the stop signal from the at least one trigger device to the vehicle. The method may thus be integrated easily in conventional systems with trigger devices in the operating environment.

Operating environments in which the method according to the invention is implemented may basically be described as intelligent zones in which the computing device performs control tasks for guiding the at least partially autonomously operated vehicles. Especially preferably the method according to the invention is carried out in an operating environment configured as a parking facility for motor vehicles. Such a parking facility can be a parking garage, in particular with several parking levels, or a parking lot with several parking places. Alternatively, the method according to the invention can also be implemented in an operating environment for vehicles configured as transport means. Such transport means (e.g. conveyors) serve in particular for goods transport, thus not for passenger transport, wherein the operating environment for example can be an industrial facility or a warehouse. Since operating personnel are frequently present in such environments, they can initiate the stopping of traffic in the relevant regions of the parking facility or the operating environment for the transport means using the triggering device.

Apart from that, the invention relates to a structure which is configured as an operating environment for at least one vehicle which is operable at least partially autonomously, comprising at least one trigger device configured for producing a stop signal to stop the vehicle. The structure according to the invention is characterized in that a computing device is provided that is operable according to the method of the invention. The structure in particular has at least one roadway for the or at least a vehicle and is preferably configured as a parking facility for motor vehicles. All embodiments of the method according to the invention may be transferred analogously to the structure according to the invention, so that with this as well the above mentioned advantages can be achieved.

Figure 2:
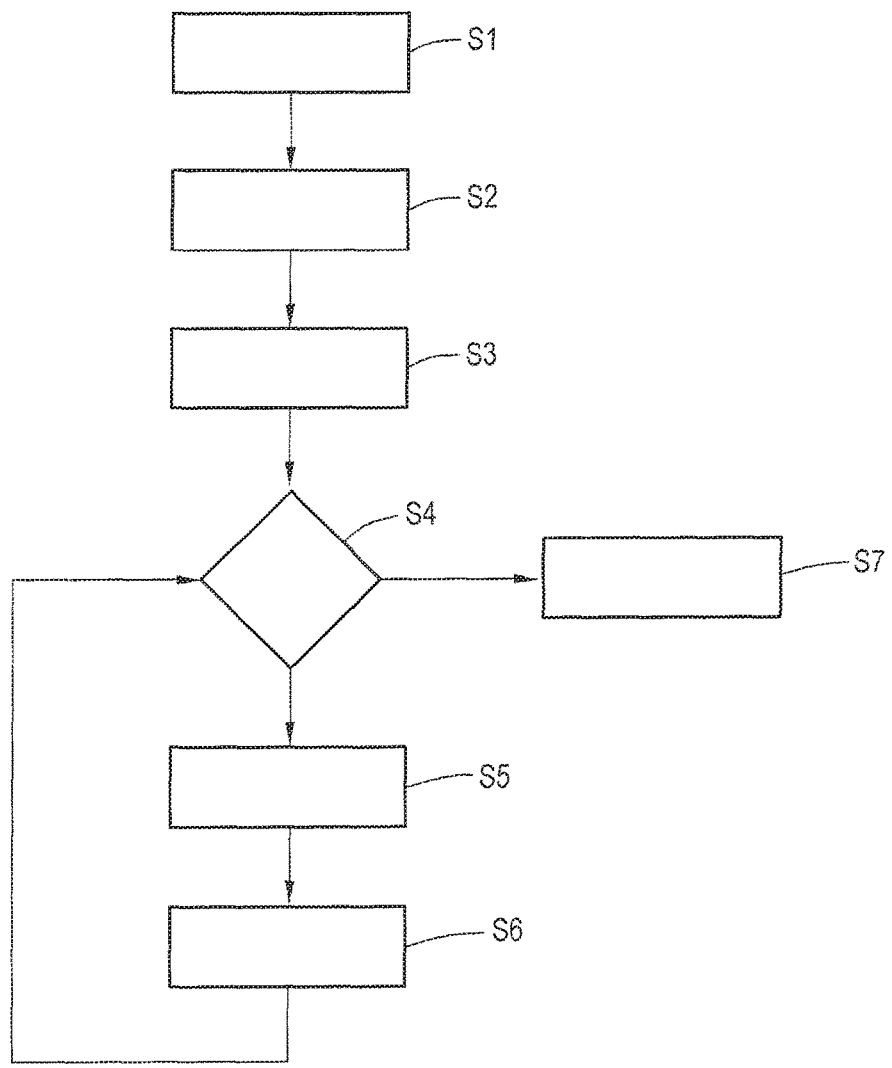
FIG. 2 is a flow diagram of a method for controlling the motor vehicles moving in the operating environment shown in FIG. 1, according to some embodiments of this disclosure.

Further details and advantages of the invention follow from the exemplary embodiments described in the following, as well as with reference to the drawings. These are schematic representations and show:

FIG. 1 illustrates a schematic sketch of a structure according to the invention from a bird's eye view as an operating environment for several autonomously operated vehicles, and;

FIG. 2 illustrates a flow diagram of a method according to the invention for controlling the motor vehicles moving in the operating environment shown in FIG. 1.

FIG. 1 shows a schematic sketch of a structure 1 in a bird's-eye view as an operating environments 2 for several autonomously operated motor vehicles 3-6. The structure 1 here is configured as a parking facility, for example, a parking garage or an open parking lot with several parking places which are not shown. Alternatively, the structure 1 can also be an operating environment 2 for motor vehicles 3-6 configured as transport means such as conveyors, e.g., and industrial facility over a warehouse. Within the structure 1 there are several fixed trigger devices 7-10 configured as manual actuation devices in the form of push switches or touch switches, a portable trigger device 11, and a further trigger device 12 configured as an interrupt sensor in the form of a light barrier. The latter secures an access 13 of the structure 1 against unauthorized entry. Different parts of the operating environments 2 are not entirely visible because of several obstacles to vision in the form of walls 14, 15.

A sensor device 16 which comprises two cameras 24 and additional radar and laser sensors which are not shown are installed in the structure 1. In addition, a fixed computing device 17, purely schematically depicted, is allocated to the structure 1 and has a communication device 18 for data communication with the vehicles 3-6, sensor device 16, and the trigger devices 7-10. The latter are configured to transmit a stop signal to the computing device 18 when they are triggered.

FIG. 2 shows a flow diagram of a method for controlling the vehicles 3-6 moving in the operating environment 2, according to which the computing device 17 operates, and which is described in the following with reference to the traffic situation shown in FIG. 1.

In step S1, the computing device 17 receives a stop signal from the trigger device 7 via the communication device 18 as a consequence of actuation of the actuation device by a person 19, who for example on the basis of a visually identified collision hazard with an object in the operating environment 2 wants to initiate an emergency stop.

In step S2, the computing device 17 evaluates positional data describing the position of the triggered trigger device 7 and the positions of the vehicles 3-6 located in the operating environment to determine a set of vehicles to be stopped. For example, computing device 17 first determines a subspace 20 of the operating environment 2 which is allocated to the trigger device 7 and is defined as a breach and 21 that is visible to the person 19. Since the trigger device 7 is arranged in a fixed position of the structure 1, the computing device 17 uses map data describing the operating environment 2 to determine the position of the trigger devices 7. The computing device 17 likewise determines the visible region 21 using the map data which shows the walls 14, 15. The subspace 20 in addition is by an expansion region 22 directly abutting the visible region 21.

This determination of the subspace 20 ensures that only such vehicles 3-6 are stopped on the basis of the stop signal about which it can be assumed that the person 19 intends a stop. As a criterion for a relevant spatial region of the operating environment 2, visibility from the perspective of the person 19 is used, wherein the visible region 21 is expanded for safety by the abutting expansion region 22. The computing device 17 then tests which vehicles 3-6 are located within the subspace 20. For this the computing device 17 evaluates the positional data of all vehicles 3-6 which it determines from the sensor data of the sensor device 16 or alternatively retrieves as its own positional indication from the vehicles 3-6. The results of this evaluation is that only the vehicle 3 is in the subspace 20 and consequently only the latter is included in the set of vehicles to be stopped.

In step S3, the computing device 17, depending on the evaluation result from the step S2, orders the vehicles 3-6 to stop, wherein here only the vehicle 3 is made to stop and the vehicles 4-6 are ordered to continue driving. Consequently the operation of the vehicles 4-6 is not impaired by triggering of the trigger device 7, since it must be assumed that the person 19 does not want these vehicles 4-6 far removed from the visible region 21 to stop.

In step S4, the computing device 17 tests an interrupt condition for further stopping of vehicles in the operating environment 2. This is fulfilled if a predetermined time period passes after receipt of the stop signal or a release signal nullifying the stop signal is received. To produce this release signal, a release can be provided, for example, on the triggering devices 7-12. Likewise the loss of a stop signal can be assessed as a release signal.

If this is not the case, in a step S5, the computing device 17 again evaluates the vehicles 4-6 not already included in the set of vehicles to be stopped with reference to the positional data as to whether they are located in the subspace 20. As can be seen from FIG. 1, the vehicle 4 for example moves from a position I at the time of execution of the step S3 to a position II in which it reaches the expansion region 22 of the subspace 20. At this time the evaluation in step S5 consequently means that the vehicle 4 is located in the subspace 20, so that it is also included in the set of vehicles to be stopped.

In a subsequent step S6, analogously to step S5, the vehicle 4 later included in the list of vehicles to be stopped is ordered to stop. The method then continues the continuous testing of step S4 to determine whether further vehicles 5-6 are located in the subspace 20 at a later time. Consequently the steps S5 and S6 are carried out during the predetermined time period following receipt of the stop signal or until receipt of the release signal.

In step S4, if the interrupt condition is fulfilled, the method is continued in a step S7 in which the stopped vehicles 3, 4 are ordered to continue driving. The method ends with this step.

Analogously hereto, according to further exemplary embodiments of the method in the traffic situation shown in FIG. 1, during triggering of the triggering device 8 only the vehicle 4, and with corresponding determination of an expansion region in addition also the vehicle 3 are stopped. During triggering of the fixed trigger devices 9, 10 on the other hand, the vehicles 4-6 are ordered to stop. This can also be applied to triggering of the triggering device 12 configured as a light barrier, wherein the positional data describing their position likewise can the obtained from map data. In the present case, for triggering of the triggering device 12, for example if a person unexpectedly and/or without authorization enters the operating environments 2 through the access 13, likewise the stopping of vehicles 4-6 would ensue.

According to a further exemplary embodiment of the method, a person 23 carrying the portable triggering device 11 actuates their manual actuation device, so that the computing device 17 analogously to the first exemplary embodiment wirelessly receives the triggering signal in step S1. However, since the trigger device 11 has a variable position within the operating environments 2, the positional data describing the position of the trigger device 11 in step S2 is not determined by the computing device 17 from the map data but by means of a position determination method, for example by means of simultaneous localization and mapping (SLAM), dead reckoning, or a laser-radio, or QR-tag-based position determination method. The subspace allocated to the trigger device 12 is likewise accordingly formed as a region visible to the person 23 depending on position. Alternatively or additionally, in determining the position of the trigger device 11, sensor data of the sensor device 16 can also be used.

According to a further exemplary embodiment which can be applied to all of the above-named exemplary embodiments, instead of determination of the subspace 20 as the surrounding region of the respective trigger device 7-12, in the steps S2, S5 for each vehicle 3-6 a subspace can be defined as the surrounding region which describes a region of the operating environment visible to a person located in the position of the respective vehicle 3-6. Inclusion of the vehicle 3-6 in the set of vehicles to be stopped here occurs when the position of the triggered trigger device 7-12 is located in the subspace allocated to the respective vehicle 3-6. Finally, a combination of these exemplary embodiments is also conceivable in which in the steps S2, S5 both a subspace allocated to the triggered trigger device 7-12 and subspaces allocated to the vehicles 3-6 are determined, wherein inclusion of a vehicle 3-6 in the set of vehicles to be stopped occurs when the subspace of the triggered trigger device 7-12 intersects with the subspace of the vehicle 3-6 to be included.

Finally, it should still be noted that according to further exemplary embodiments the evaluation in the steps S2, S5 can also mean that no vehicle 3-6 is to be included in the set of vehicles to be stopped, so that the set is empty. In this case all vehicles 3-6 in the steps S3, S6 are ordered to continue driving. Of course the evaluation in the steps S2, S5 in other operating cases can also mean that all of the vehicles 3-6 located in the operating environment 2 are to be included in the set of vehicles to be stopped, wherein all vehicles 3-6 in the steps S3, S6 are ordered to stop.

The invention claimed is:

1. A method, performed by a computing device allocated to an operating environment, for controlling at least one vehicle moving at least partially autonomously within the operating environment, in which there is at least one trigger device configured to trigger a stop signal for stopping the at least one vehicle, the method comprising:
   receiving the stop signal from the at least one trigger device;
   determining a set of vehicles to be stopped by evaluating positional data describing a position of the at least one trigger device and a position of the at least one vehicle located in the operating environment; and
   ordering the at least one vehicle to stop based on the evaluation of the positional data.

2. The method according to claim 1, wherein the at least one trigger device comprises at least one fixed trigger device or at least one portable trigger device.

3. The method according to claim 1, wherein the at least one trigger device comprises a push switch or a touch switch.

4. The method according to claim 1, wherein the at least one trigger device comprises an interrupt sensor including a light barrier or the at least one trigger device comprises a proximity sensor.

5. The method according to claim 1, wherein the determining the set of vehicles to be stopped comprises:
considering at least one subspace of the operating environment associated to a fixed trigger device or positionally-dependent to a portable trigger device or to a vehicle.

6. The method according to claim 5, wherein the evaluating the positional data comprises:
determining whether the position of the at least one vehicle is located within the at least one subspace.

7. The method according to claim 5, wherein the at least one subspace associated to the fixed trigger device or the portable trigger device describes a visible region of the operating environment for a person triggering the fixed trigger device or the portable trigger device.

8. The method according to claim 5, wherein the at least one subspace associated to the vehicle describes a region of the operating environment visible to a person located at the position of the vehicle.

9. The method according to claim 1, wherein the stop signal is triggered during an interruption of a communication connection between the at least one trigger device and the computing device.

10. The method according to claim 1, further comprising:
during a predetermined or pre-determinable time period after receipt of the stop signal or until receipt of a release signal nullifying the stop signal, evaluating positional data of a second vehicle that does not belong to the set of vehicles to be stopped; and
ordering the second vehicle to stop depending on the evaluation of the positional data of the second vehicle.

11. The method according to claim 1, further comprising:
determining the positional data at least partially from sensor data of a sensor device arranged within the operating environment.

12. The method according to claim 1, further comprising:
considering map data describing the operating environment during the evaluation of the positional data; or
determining the positional data at least partially from the map data.

13. The method according to claim 1, further comprising:
forwarding the stop signal to the at least one vehicle for controlling the at least one vehicle to be stopped.

14. The method according to claim 1, wherein the operating environment comprises a parking facility for motor vehicles or a transport means.

15. A structure which is designed as an operating environment for at least one vehicle drivable at least partially autonomously, the structure comprising:
at least one trigger device configured to generate a stop signal for stopping the at least one vehicle; and
a computing device configured to:
receive the stop signal from the at least one trigger device;
determine a set of vehicles to be stopped by evaluating positional data describing a position of the at least one trigger device and a position of the at least one vehicle located in the operating environment; and
order the at least one vehicle to stop based on the evaluation of the positional data.

16. The structure according to claim 15, further comprising:
a sensor device arranged within the operating environment, wherein the computing device is further configured to determine the positional data at least partially from sensor data of the sensor device.

17. The structure according to claim 15, wherein the computing device is further configured to:
consider map data describing the operating environment during the evaluation of the positional data; or
determine the positional data at least partially from the map data.

18. The structure according to claim 15, wherein the computing device is further configured to:
forward the stop signal to the at least one vehicle for controlling the at least one vehicle to be stopped.

19. The structure according to claim 15, wherein the at least one trigger device is configured to trigger the stop signal during an interruption of a communication connection between the at least one trigger device and the computing device.

20. The structure according to claim 15, wherein to determine the set of vehicles to be stopped the computing device is further configured to:
consider at least one subspace of the operating environment associated to a fixed trigger device or positionally-dependent to a portable trigger device or to a vehicle.

* * * * *